March 8, 1955  T. K. M. SMITH  2,703,745
CONTINUOUS CHART RECORDING
Filed Feb. 11, 1952  2 Sheets-Sheet 1

INVENTOR,
THOMAS K. M. SMITH
BY Francis A. Ammen
ATTORNEY.

March 8, 1955     T. K. M. SMITH     2,703,745
CONTINUOUS CHART RECORDING
Filed Feb. 11, 1952     2 Sheets-Sheet 2
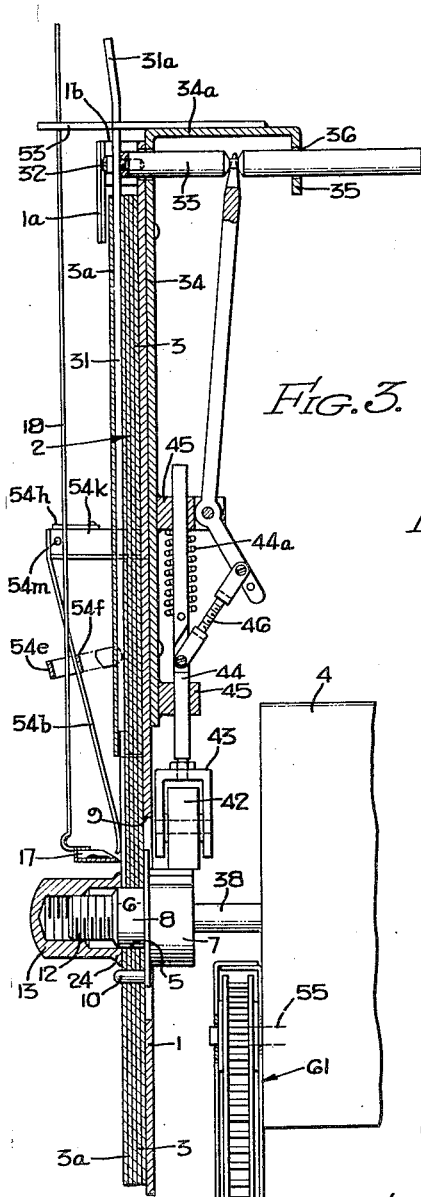
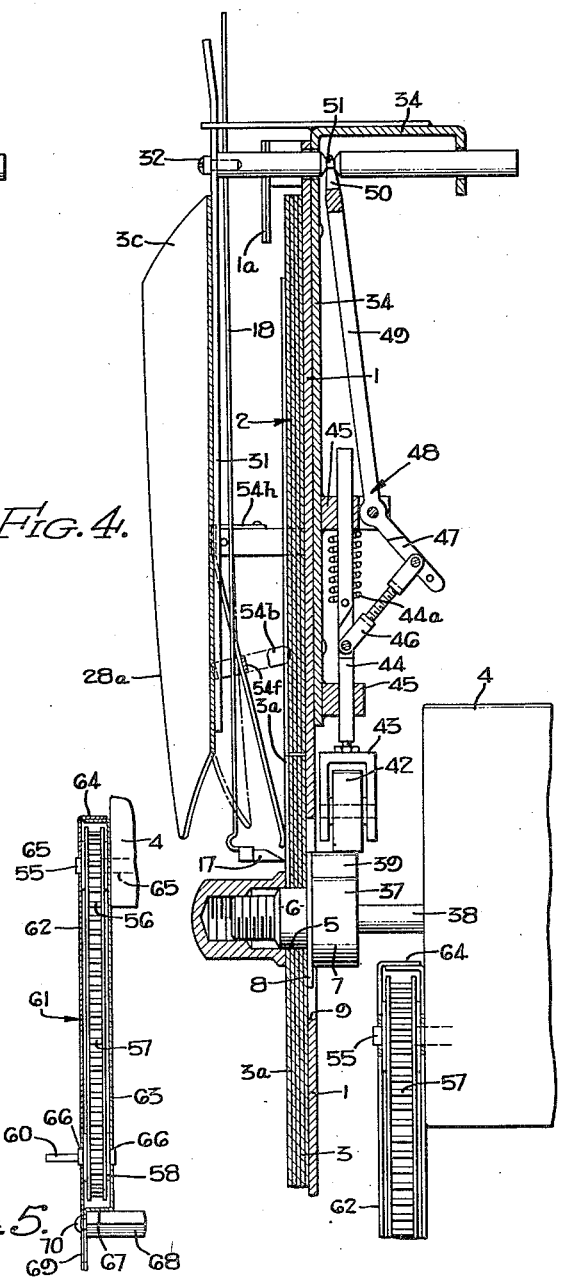
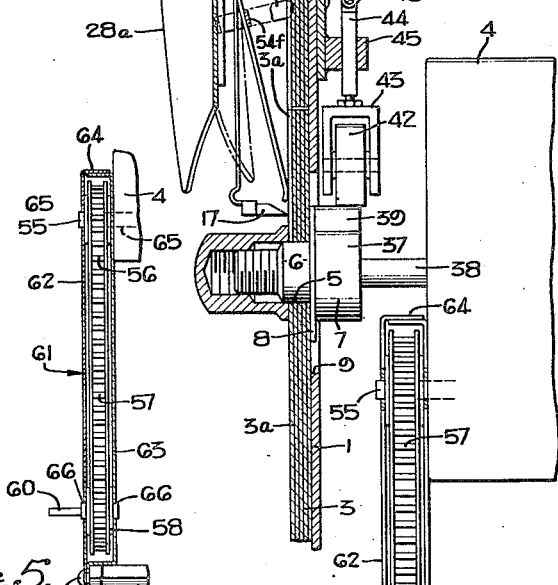
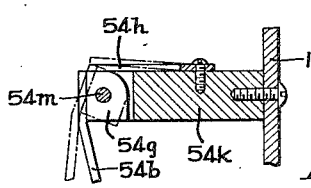
INVENTOR.
THOMAS K. M. SMITH
BY Francis D. Ammen
ATTORNEY.

United States Patent Office 2,703,745
Patented Mar. 8, 1955

2,703,745
CONTINUOUS CHART RECORDING
Thomas K. M. Smith, Anaheim, Calif.
Application February 11, 1952, Serial No. 270,980
7 Claims. (Cl. 346—121)

This invention relates to recording instruments such as employed for making records of any variable, for example varying pressure, temperature, etc. Such instruments usually include a recording stylus or pen, the position of which on a moving chart, varies in accordance with a varying pressure, temperature, or the like. In accordance with the usual practice, a single chart, usually of circular form, is mounted on the face plate or platen of the instrument, and it is rotated by a motor or clock mechanism so as to make a complete revolution in any given period of time; it is the usual procedure to take a record for 24 hour periods where a continuous record of a variable quantity or effect is to be recorded.

Hence, it is usual with such recorders, to employ a circular chart the surface of which is divided into twenty-four equal divisions, each of which represents the lapse of one hour in time. These divisions are numbered in succession to represent the time of day, including a. m. and p. m. time, and at a certain time each day it is customary to remove the chart that carries the last twenty-four hour record, and to substitute a new similar chart to receive the next 24 hour record. An objection to this practice with most instruments now in use, is that if the attendant is late in arriving at the station where the instrument is located, the stylus or recording pen will have passed the time indicated on the chart where it commenced its record, and if a new chart is not substituted at such a time, the new chart will not have a complete record for the twenty-four hours that it represents.

The present application is a continuation in part of my prior application titled Recording on Charts, filed March 3, 1949, bearing Serial Number 79,445.

One of the objects of this invention is to provide elements having features of construction enabling them to be used with an instrument of this character, that will enable it to cooperate with a bank or stack of charts set on the instrument; and capable of cooperating with the charts after the lapse of any given period, to shift the recording operation from any chart, on which the record has been completed, to the next chart adjacent to it in the bank or stack. Furthermore, my invention relates not only to the instrument, but also to certain improvements in construction of the charts themselves.

Although my invention is not limited in its application to a rotary type of recorder, operating to take a record on a circular chart, in the present specification it is described as applied to that type of instrument.

In accordance with my invention, the outermost chart of the bank or stack referred to above, receives the first recording from the stylus. When such a chart is used with a stylus that moves in a transverse direction or general radial direction on the face of the chart to inscribe the recording line as the chart is advanced by the motor, I provide the chart with a transverse slit extending into the same from its edge. In the case of a circular chart that is to be used on a rotary type of recording instrument, this slit will extend in a substantially radial direction inwardly from the outer edge of the chart. If desired, this slit may be placed at one of the time divisions of the chart, for example, 8 a. m., at which time such a chart in ordinary practice would be removed and a new chart substituted in the instrument.

One of the objects of my invention is to provide simple means on the instrument, to cooperate with such a slit chart to effect a lifting of the rear edge of the slit with respect to the direction of advance of the chart so that at the completion, or near the completion of the record on that chart, this edge will be lifted and guided up over the outer side of the stylus arm or arms that are provided for carrying the stylus that is making the record.

One of the objects of my invention is to accomplish the lifting of the rear edge of the slit referred to above, by providing automatically actuated means that is placed between the outermost chart and the remainder of the charts in the bank or stack.

Another object of the invention is to provide a chart having features of construction which will enable it to be readily altered by the attendant to enable it to cooperate in accordance with my novel mechanism so that means on the instrument will pass under the rear edge of the slit and segregate it from the remainder of the charts in the bank or stack.

Recording instruments of this type are usually actuated by a spring-driven clock motor, and in the rotary type of such instruments the motor is usually located in a position such that when the chart is put in place, the chart is located immediately in front of, and covers the winding stem of the motor. On account of this location for the winding stem, it is necessary to wind the clock motor when the chart has been removed, and a new chart is to be substituted. This arrangement is satisfactory of course, where such an instrument operates upon a single chart at a time, but in practicing my invention, when a plurality, stack, or bank of charts are on the instrument, it is desirable to avoid the necessity for removing all of the charts, on, or in, the instrument whenever the instrument must be wound. Hence, one of the objects of this invention is to provide an instrument of this type, with means for effecting the winding of the motor without necessitating the removal of the charts that are carried in the instrument.

Further objects of the invention will be evident from a careful study of the specification and the drawing.

The invention resides in the novel features of construction of the instrument to be described hereinafter, all of which cooperate to enable continuous recording to be accomplished on the instrument, by effecting the transfer of the recording operation from a completely recorded chart to the chart that is next adjacent to the same.

The invention resides also, in the novel features of the construction of the chart, which enable the same to be handled like an ordinary chart, but constructed to that it can be readily altered to enable it to cooperate with the instrument of my invention, to effect its purposes.

A preferred embodiment of the invention is described in the following specification, while the broad scope of the invention is pointed out in the appended claims. These instruments are usually mounted on a wall or the like, so that the instrument carries the stack of charts in a vertical plane.

In the drawing:

Figure 1 is a front elevation of an instrument embodying my invention, certain parts being broken away at the center to disclose working parts beneath. In this view the uppermost chart of the bank of charts is shown with an incomplete recording line upon the same. This view also shows the casing of the instrument with its hinged cover partially broken away and in its open position at the side of the casing so as to expose some of the recording mechanism.

Figure 2 is a perspective of the chart embodying my invention, and particularly illustrating its novel features, some of which have been referred to above.

Figure 3 is a transverse section taken about on the line 3—3 of Figure 1 and particularly illustrating further details of an embodiment of the invention in which automatic means in the instrument lifts the rear edge of the slit with respect to the direction of rotation, by pressure exerted upon the inner face of the chart near the slit. This view shows the lifting means in its normal position such as it would have at a time just prior to the time that it is actuated to lift the rear edge of the slit. This view also further illustrates in dotted lines, some details of the winding means.

Figure 4 is a view similar to Figure 3, but illustrates the lifting means in active operation and in the advanced position which it assumes when lifting the rear edge of the chart to guide it over the outer side of the stylus arm.

Figure 5 is a detail side elevation of the chain drive assembly that I employ for reasons that will be described in the following portion of the specification.

Figure 6 is a detail section taken on the line 6—6 of Figure 1 illustrating means I employ to guard the stylus or pen-arm and to press the stack of charts back against the driving head of the instrument, and its face-plate or platen.

Figure 1:
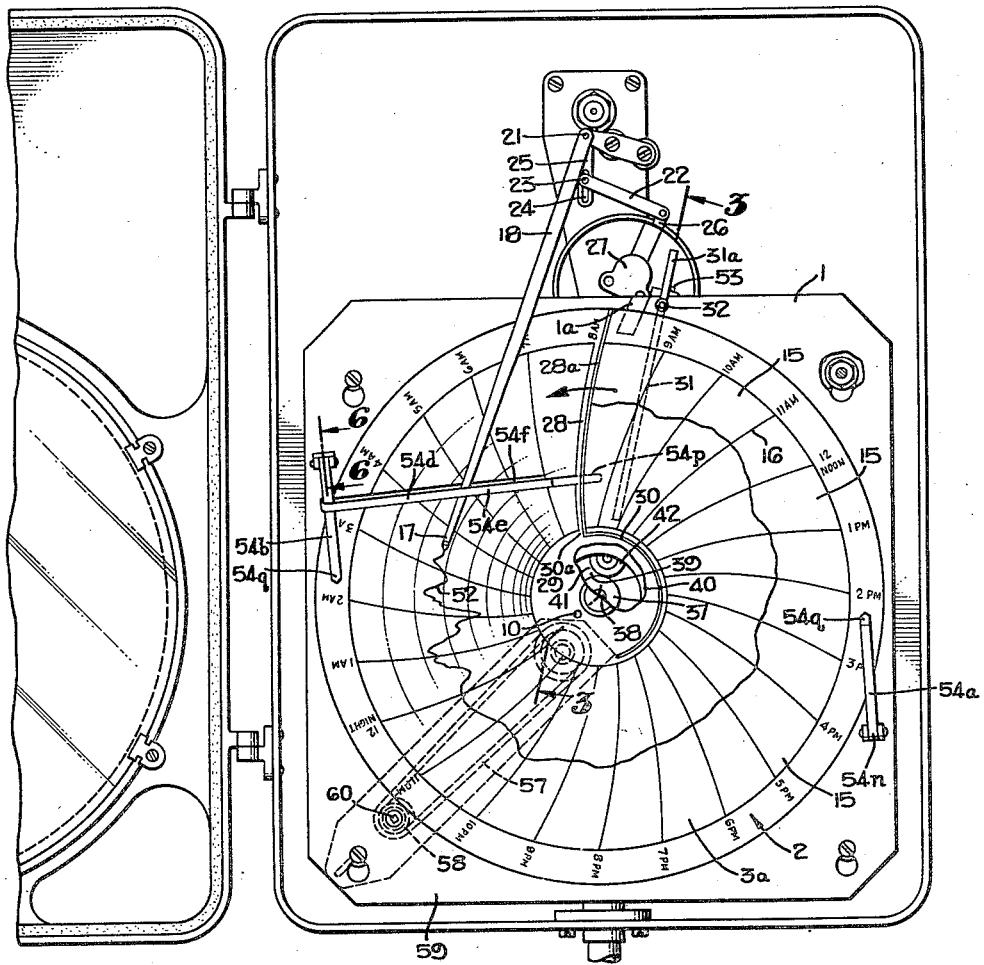
Figure 2:
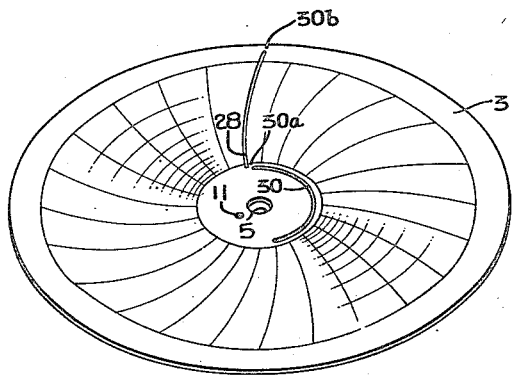

Referring more particularly to the parts, and particularly to Figures 1 to 3 inclusive, 1 indicates the face plate of the instrument which, in the present instance, is a fixed plate on which a plurality of my charts are placed in a bank or stack 2 comprising an outermost chart 3a and a plurality of charts 3 between it and the face plate 1.

In the present instance, these charts are rotated by a clock motor 4 mounted in the instrument behind the face plate 1. The charts illustrated are of circular form, and are each provided with the usual central opening 5 which adapt them to be placed over a reduced neck 6 on a driving hub 7 which is formed near its outer end into a collar 8 of larger diameter, the outer face of which is flush with the outer face of the face plate 1. As shown clearly in Figures 3 and 4, the collar 8 lies in a relatively large opening 9 in the face plate.

In the present instance, the charts are rotated by means of a driving pin 10 (see Figure 3) which projects out from the outer face of the collar 8 that carries it, and this pin is received in aligning openings 11 formed in the charts. The upper end of the hub 7 has a threaded tip 12 of reduced diameter, on which a threaded cap 13 is received, and which has an integral base 24 of enlarged diameter, that secures the central portions of the charts against the collar 8.

As illustrated in Figure 1, which shows the outermost chart 3a in full view, the surface of this chart is divided into twenty-four equal divisions 15 which represent the successive hours of a day, and the dividing lines 16 between these divisions 15, are numbered in succession so as to indicate the hours of the day including legends "A. M." and "P. M." and the legend "Noon," to indicate the time of day at which each of these divisions will arrive under the pen or point 17 of a stylus such as the stylus or pen carried on a pen arm 18. In the drawing a single stylus is illustrated, carrying the pen point 17 which is in the form of a small cup capable of holding a few drops of ink which is sufficient for 24 hours. The stylus is mounted for rotation on a horizontal pin 21, any suitable means being provided for imparting the motion to the stylus arm, that enables the stylus to record a pressure temperature, or any other variable thing, the variations of which are to be recorded on the chart. In the present instance, such a mechanism may include a link 22, one end of which is attached by an adjustable connection 23 at a slot 24 formed in an operating arm 25 that is rigid with the stylus arm 18. The link 22 at its other end, is attached to a movable part such as an arm 26 that swings to and fro about an axis at 27 accordingly as it is controlled by the pressure or temperature, or other thing that controls the movements of the stylus arm.

At one of the dividing lines 16 representing the same hour, all of the charts in the stack are provided with a slit 28 that extends inwardly from the edge of the chart to the central portion or nave 29 of each chart; the dividing lines 16 are disposed in an arc which is on the same radius as an arc that would be described by the stylus point 17 on a chart if the chart were stationary. The inner portion of each slit 28 terminates at a point adjacent to one end of an arcuate slit 30 disposed arounnd the center point or axis of the chart, and this arcuate slit 30 preferably extends around through approximately 180°, but leaving a small bridge 30a of the material. This is for a purpose that will presently appear. In addition to the bridge 30a there is a similar bridge of material 30b located at the outer end of the "radial" slit 28 where it terminates near the periphery of the chart disc (see Figures 1 and 2).

These two bridges of material are to be broken away on the chart that is to become immediately the one that is to be recorded upon. In this way the body of charts lies compactly together just as though they were without the slits.

In order to effect the lifting of the rear edge 28a of the slit 28 of the outer chart 3a, I provide a lifting arm or bar 31 which is supported near the outer edge of the face plate 1 so that it extends in a general radial direction into the stack of charts and immediately behind the outermost chart 3a. This bar 31 is mounted so that it can be withdrawn so it is preferably mounted on a pivot pin or screw 32, enabling it to be swung around to bring it out of the stack of charts when desired, and particularly when a completed chart is being removed, for then it is necessary to place the arm under the next chart behind the front chart 3a. For this purpose the arm 31 is preferably supported on a stem 33 that is guided for vertical movement in the casing, for which purpose the under side of the face plate 1 is provided with a guide bracket 34 having a body of plate form, and the outer portion of which is bent downwardly and inwardly so as to form a guide ear 35 with an opening 36 through it, to receive the lower portion of the stem.

As illustrated in Figure 1, the bar 31 may extend in a substantially radial direction which in the present instance is substantially parallel to the general direction in which the stylus arm 18 extends when in the middle of its travel. This is to facilitate lifting the rear edge 28a of the slit 28 over the outer side of the stylus arm when this slit arrives in a position such as that illustrated in Figure 1.

In accordance with my invention, I prefer to provide mechanical means operating automatically at the proper time to effect a longitudinal shifting of the stem 35, to shift this arm 31 away from the stack and move the edge 28a in a manner such as indicated in Figure 4, so that the edge 28a will ride out over the forward side of the stylus arm that is remote from the bank of charts. Any suitable means may be employed for this purpose, but in the present instance, I form the hub 7 as a cam 37 that is rigid on the shaft 38 of the motor, and this cam at a suitable point on its periphery, is formed with a lifting tooth or abutment 39.

In Figure 1, the charts are broken away near their central point as at 40, so as to disclose this lifting toe 39 of the cam. This toe has an inclined or curved forward face 41 with respect to the direction of rotation of the cam, which is engaged by a roller 42 carried in a yoke 43 attached to the inner end of a radially guided slide bar 44 that is guided in two lugs 45 that extend out from the rear side of the body of the bracket 34. At a suitable point between the guide lugs 45, an adjustable link 46 is provided, which extends downwardly so that its lower end is pivotally attached to the short arm 47 of a bell crank lever 48, the long arm 49 of which is connected up in some suitable manner to the stem 33 to enable the to and fro swinging movement of the arm 49 to be imparted to the stem and to the lifting bar 31. In the present instance, this is accomplished by providing the end of the arm 49 with a tapered tip formed with a slot 50 which receives a reduced neck or waist 51 formed on the stem 33.

The roller 42 is maintained in engagement with the face of the cam 37 by a coil spring 44a thrusting against the under side of the uppermost lug 45.

In view of the employment of the elements described, and which are actuated by the cam 37, it will be evident that at the proper predetermined time of day, the arm 31 will be moved outwardly, thereby pushing out the rear edge 28a of the slit 28 sufficiently to enable it to pass over the outer side of the stylus arm, as particularly illustrated in Figure 4. With this mode of operation, it will be evident that when the slit 28 arrives at a position where its outer end is under the arm 18, the edge 28a will pass over and eventually be supported by the arm 18. If the instrument is supported on a wall, the arm 18 will simply fend the area of the outermost chart lying to the rear of the edge 28a, away from the remainder of the charts 3 in the stack; and as soon as the slit 28 arrives at the pen 17 of the stylus, the line 52 that is being drawn on the uppermost chart, will cross the slit and commence to record on the next adjacent chart to it.

The outward shifting of the edge 28a and the guiding over the outer side of the stylus arm 18, is greatly facilitated by the presence of the arc-shaped slit 30 that communicates with the radial portion of the slit 28 where the bridge 30a has been broken away.

It will be evident that a friction force is exerted against the bar 31, tending to rotate it on its pivot or screw 32 in a clockwise direction. So, in order to enable the arm to maintain itself in the substantially radial position in which it is illustrated, I prefer to construct this bar 31 so that it has a tail arm 31a, and on the vertical extension 34a of the bracket 34, I attach a stop finger 53 that extends upwardly at the right side of the tail arm 31a, to resist this drag or friction force exerted by the charts. This tail arm 31a also operates as a handle for swinging the bar 31 in an anticlockwise direction around its pivot screw 32, by the attendant, to swing it out of the stack of charts and replace it below the chart to which the recording has been transferred from the outermost chart; in other words, it is replaced below the forward chart from the top of the stack after a completed chart is removed.

It is desirable to provide means for holding the stack of charts 3 back against the face plate, so as to keep the charts in stack form as the instrument is generally hung on a wall, so that the face plate 1 is in a vertical plane. For this purpose I may provide two presser arms 54a and 54b which as illustrated, are disposed substantially diametrically opposite to each other. Each of these arms is mounted on the face plate of the instrument by means of a spring hinge connection 54c which enables their downwardly offset tips 54q to press resiliently against the opposite edges of the stack, or they may be formed with resilient bows that maintain this pressure.

The pen-arm 18 is of flat resilient metal with its flat faces in a vertical plane. Its flexibility facilitates moving the pen arm forward to place it out of the way when a new stack of charts is being loaded into the instrument. In order to facilitate this operation I prefer to form a bifurcated pen-lifter 54d integrally with the pressure finger 54b. The forks 54e and 54f of this pen-lifter lie respectively at the outer side, and the inner side, of the pen arm with respect to the face of the outermost chart 3a. Figure 6 illustrates the details of the mounting for this presser arm. Its butt end has a substantially square hub 54g the rear side of which lies against a leaf spring 54h attached to the rear face of a post 54k to the outer slotted end of which the presser arm 54b is attached on a pivot bolt 54m passing through the hub. When the presser arm is pulled out to a position such as indicated by the dotted lines in Figure 6 the spring 54h will maintain it there. When this presser arm is lifted the inner fork pushes out against the pen arm and flexes it outwardly from the face plate of the instrument. The construction at the head of the post 54k is not novel per se, but the function of spring 54h is important in that it co-operates with the other elements to press the presser arm against the pack in one position and holds the pin-arm away in its other position.

The other presser arm 54a is preferably mounted on its own post 54n similar to the post 54k employing the same kind of spring 54b and pivoting effect for holding the presser arm in working position or up out of the way when a stack of charts is being put in place.

When the slot 28 is run past the location of the arm 31 the cam toe or abutment 39 pushes the bar 44 outward, and this movement shifts the stem 33 outward thereby moving the rear edge 28a of the slot outward. As the stack of charts continues to revolve, this edge rides out beyond a keeper 1a mounted on a supporting block 1b secured to the upper side of the face plate 1. An inwardly bent tip 54p on the inner end of the upper fork 54e assists in guiding the zone 3c of the completed chart up over the pen-arm. This enables the pen point 17 to ride on the face of the next chart when the slit 28 arrives at the location of the pen point.

When the attendant arrives he removes the outer chart the record on which is completed, and pushes the handle 31a toward the left to swing the arm 31 out of contact with the pack and replaces it back of the foremost chart of the reduced pack so that it can function to lift its edge 28a when it arrives at a point just past the location of the arm 31.

The motor has a winding stem 55, and in order to enable the motor to be wound from time to time when necessary, I provide the winding stem 55 of the motor with a sprocket wheel 56 and a chain 57 that runs over the sprocket wheel, the outer end of this chain passing around the sprocket wheel 58 that is located near the edge of the face plate preferably near a corner of the case, such as at the corner 59. At this point a countershaft is mounted, having an angular head 60. As illustrated, the head 60 is of square form, enabling a winding crank with a square socket, to be applied to the head 60 for winding the motor whenever that becomes necessary. As stated above, by placing this winding head 60 beyond the edge of the stack of charts, the motor can be wound whenever desired, regardless of whether there are any charts still left on its face plate 1 or not.

It is found in practice that the springs of the motors for these instruments are quite strong, as a result of which, when the winding up of the motor is nearly completed a considerable torque is developed in the winding stem 55 the result of which is that the tension in one of the runs of the chain 58 is very high. This causes a considerable lateral strain on the projecting end of the winding stem 55. In order to overcome this difficulty I provide a box-form housing 61 for the chain 57 which may be made of sheet metal, including an outer wall 62 and an inner wall 63 connected at their upper end by the wall 64. The plates 62 and 63 have openings 65 operating as bearings for the projecting end of the stem 55. At the other end of the chain the walls 62 and 63 have similar openings 66 that operate as bearings for the shaft that carries the winding head 60.

Many other embodiments of this invention may be resorted to without departing from the spirit of the invention.

At the lower end of the box form housing or casing for the sprocket chain the inner wall 63 is bent outwardly to form a lower end wall 67 that lies against the upper side of a rigid post 68 (see Figure 5) that is mounted at its foot (not illustrated) in the face plate 1. The extension 67 is bent into a vertical plane at its outer end to form a foot abutting against the inner face of an extension 69 of the outer plate 62; and both of these superposed extensions are secured to the outer end of the post 68 by a screw 70. With this construction it will be evident that this boxing will, through the agency of the bearing openings 65 and 66, resist the forces developed in the runs of the chain and relieve the stem 55 of this objectionable stress referred to above.

When the stack of charts 3 is put in place on the face plate 1, all of their slits 28 are in alignment with each other. Their edges are slipped under the guide finger 1a. The presser fingers 54a and 54b having been swung up, are then let down onto the edge of the stack. Of course, as they are put in place all of their openings 11 which are in alignment, will slip over the driving-pin 10.

After putting the charts in place in this way the operator breaks the material of the outermost chart at the bridges 30a and 30b. This is necessary to enable the lifter arm 31 to break out the outermost chart from the pack of charts when its record is complete.

I claim as my invention:

1. In a recording instrument for making a record on charts, the combination of means for supporting and advancing a pair of superposed charts, said charts having substantially aligning slits through the same extending in a general radial direction, a controlled stylus for recording on one of said charts, and means including a cam and means actuated thereby, for effecting the shifting of the recording to the other chart after a recording has been completed on the first named chart.

2. A recording machine according to claim 1, in which the stylus records first on the chart nearest to it, and including means for guiding a portion of that chart to pass on the outer side of the stylus when the record on the first chart is substantially completed, thereby enabling the stylus to continue the recording on the next chart.

3. In a recording instrument, the combination of means for supporting and advancing a pair of superposed charts said charts having substantially aligning slits through the same extending in a general radial direction, a controlled stylus mounted to move across said charts for recording upon the outer chart, said slits being located on the charts at a point where the record upon the same becomes completed, and means including a cam and a part actuated through the agency of the cam, and lying between the outermost chart and the chart adjacent to it for lifting the rear edge of the slit on the outermost chart to guide the same out and over the stylus, thereby enabling the stylus to continue the recording on the other chart.

4. In a recording instrument, the combination of means for supporting and advancing a pair of superposed charts, said charts having substantially aligning slits through the same, a controlled stylus mounted to move over said charts for recording first upon the outermost chart, and means including a cam and a part actuated through the agency of the cam and lying between the outermost chart and the chart adjacent to it for effecting the lifting of the rear edge of the slit of the outermost chart to guide the same up and over the stylus, thereby enabling the stylus to continue the recording on the inner chart.

5. In a recording instrument, the combination of a stack of substantially circular superposed charts, said charts having substantially radial slits therethrough in substantial alignment with each other, means for supporting said charts, mechanism for rotating said charts, a controlled stylus arm mounted so as to project across the surface of the outermost of said charts for recording first upon the same, a bar located between the outermost chart and the remainder of the stack of charts, and lying adjacent the rear edge of its slit with respect to the direction of rotation, means for guiding said bar to enable the same to move the outermost chart away from the remainder of the charts, and automatic means for moving the said bar to lift the said rear edge of the outermost chart at a predetermined time to enable its rear edge to travel past the stylus arm on the side thereof remote from the charts.

6. A recording instrument according to claim 5, including a pivotal connection for the outer end of said bar enabling the same to be swung out of the bank of charts and returned to the same under the chart next adjacent to the one that has just received a recording.

7. In a recording instrument, the combination of a stack of substantially circular superposed charts, said charts having substantially radial slits therethrough in substantial alignment with each other, means for supporting said charts, mechanism for rotating said charts, a controlled stylus arm mounted so as to project across the surface of the outermost of said charts for recording upon the nearest of the same, a lifter bar located between the outermost chart and the remainder of the stack of charts, and capable of lying adjacent the rear edge of the slits with respect to the direction of rotation, a stem guided to move along a line substantially parallel to the axis of rotation of said charts and operatively connected to said bar, said mechanism including a cam rotating in unison with the charts, means actuated by the cam for moving the stem at a predetermined time to enable the lifter bar to lift the rear edge of the outermost chart to enable it to travel past the stylus arm on the side thereof remote from the charts, means for mounting said arm so as to enable the same to be swung outwardly away from the charts and returned to the same under the chart that is next adjacent to the outermost chart.

References Cited in the file of this patent

UNITED STATES PATENTS

| | | |
|---|---|---|
| 506,988 | Fecht | Oct. 17, 1893 |
| 1,235,260 | Tubesing | July 31, 1917 |
| 1,300,113 | Boyle | Apr. 8, 1919 |
| 1,715,521 | Summers | June 4, 1929 |
| 1,969,241 | Sundblad | Aug. 7, 1934 |
| 2,156,289 | Hoy | May 2, 1939 |

FOREIGN PATENTS

| | | |
|---|---|---|
| 94,587 | Austria | Oct. 25, 1923 |

OTHER REFERENCES

Fornbacker (A. P. C.), Ser. No. 352,111, published May 25, 1943.